US008633940B2

(12) United States Patent
Pothana

(10) Patent No.: US 8,633,940 B2
(45) Date of Patent: Jan. 21, 2014

(54) METHOD AND SYSTEM FOR TEXTURE COMPRESSION IN A SYSTEM HAVING AN AVC DECODER AND A 3D ENGINE

(75) Inventor: Sai Pothana, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1191 days.

(21) Appl. No.: 12/535,457

(22) Filed: Aug. 4, 2009

(65) Prior Publication Data

US 2011/0032251 A1 Feb. 10, 2011

(51) Int. Cl.
*G09G 5/00* (2006.01)

(52) U.S. Cl.
USPC ............................ 345/582; 345/552; 345/587

(58) Field of Classification Search
None
See application file for complete search history.

(56) References Cited

U.S. PATENT DOCUMENTS

2007/0019740 A1* 1/2007 Budagavi ................. 375/240.25

OTHER PUBLICATIONS

Anton V. Pereberin, "Hierarchical Approach for Texture Compression", 1999, International Conference Graphicon, Proceedings of GraphiCon '99, pp. 195-199.*

* cited by examiner

*Primary Examiner* — Ulka Chauhan
*Assistant Examiner* — Robert Bader
(74) *Attorney, Agent, or Firm* — Thomas|Horstemeyer, LLP.

(57) ABSTRACT

A texture compression engine of a graphics device receives an uncompressed texture of a 3D graphic application. The received uncompressed texture is transcoded into an AVC reference picture stream. A plurality of mipmaps is constructed from the received uncompressed texture. The texture compression engine determines a texture compression rate based on available memory capacities. The texture compression engine compresses the received texture and its mipmaps at the determined texture compression rate. The compressed texture and mipmaps are further transcoded into the AVC reference picture stream and stored. The transcoded texture and mipmaps comprise either RGB or YCbCr components for a RGB uncompressed texture. The transcoded texture and mipmaps comprise monochrome or luma components for an ARGB uncompressed texture. A graphics accelerator in the graphics device is operable to acquire the stored texture and mipmaps for a 3D graphics scene. The acquired texture and mipmaps are decompressed by AVC decoding.

14 Claims, 6 Drawing Sheets

METHOD AND SYSTEM FOR TEXTURE COMPRESSION IN A SYSTEM HAVING AN AVC DECODER AND A 3D ENGINE

CROSS-REFERENCE TO RELATED APPLICATIONS/INCORPORATION BY REFERENCE

Not Applicable.

FIELD OF THE INVENTION

Certain embodiments of the invention relate to three-dimensional (3D) computer graphics. More specifically, certain embodiments of the invention relate to a method and system for texture compression in a system having an AVC decoding engine and a 3D engine.

BACKGROUND OF THE INVENTION

A texture is generally represented as a one-, two- or multi-dimensional array of data items used in the calculation of the color or appearance of fragments produced by rasterization of a computer graphics image. A texture may be used to represent image data (either photographic or computer generated), color or transparency data, roughness/smoothness data, and/or reflectivity data. Textures are used to store various parameters such as transparency, reflectivity, and/or bumpiness for a rendering pipeline.

Texture mapping is utilized in the field of 3D computer graphics. For texture mapping, a texture is stored and mapped on to one or more surfaces of a three-dimensional computer model during rendering to represent surface detail in the final image of the model. Texture mapping is employed to increase the visual complexity of a scene without increasing its geometric complexity. Texture mapping allows a rendering system to map an image onto simple scene geometry to make objects look much more complex or realistic than the underlying geometry. Providing realistic computer graphics typically requires many high quality and detailed textures, which may require a large amount of memory. For a particular scene, the memory required by the textures is dependent on the number of textures and the size of each texture.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for texture compression in a system having an AVC decoding engine and a 3D engine, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for texture compression in a system having an AVC decoding engine and a 3D engine. In various embodiments of the invention, a texture compression engine of a graphics device is operable to receive an uncompressed texture of a 3D graphic application from a texture source comprising, for example, a texture database and/or one or more libraries. The received uncompressed texture may be transcoded into an advanced video coding (AVC) reference picture stream. A plurality of mipmaps may be constructed from the received uncompressed texture. The texture compression engine may be operable to determine a texture compression rate based on available memory capacities. The texture compression engine may be operable to compress the received texture and the constructed plurality of mipmaps at the determined texture compression rate. The compressed texture and the compressed plurality of mipmaps may be further transcoded into the AVC reference picture stream. The transcoded texture and the transcoded plurality of mipmaps may be stored. In instances where the received texture is a RGB texture, the transcoded texture and plurality of mipmaps may comprise either RGB or YCbCr components. In instances where the received texture is an ARGB texture, the transcoded texture and plurality of mipmaps may comprise monochrome or luma components. A graphics accelerator of the graphics device may be operable to acquire or download the stored texture and said stored plurality of mipmaps for desired graphics information on a 3D graphics scene. The graphics accelerator of a graphics device may be operable to decompress the acquired texture and said acquired plurality of mipmaps by performing AVC decoding. The decompressed texture and the decompressed plurality of mipmaps may be utilized by a video display engine of the graphics device to produce graphics information for display.

Figure 1:
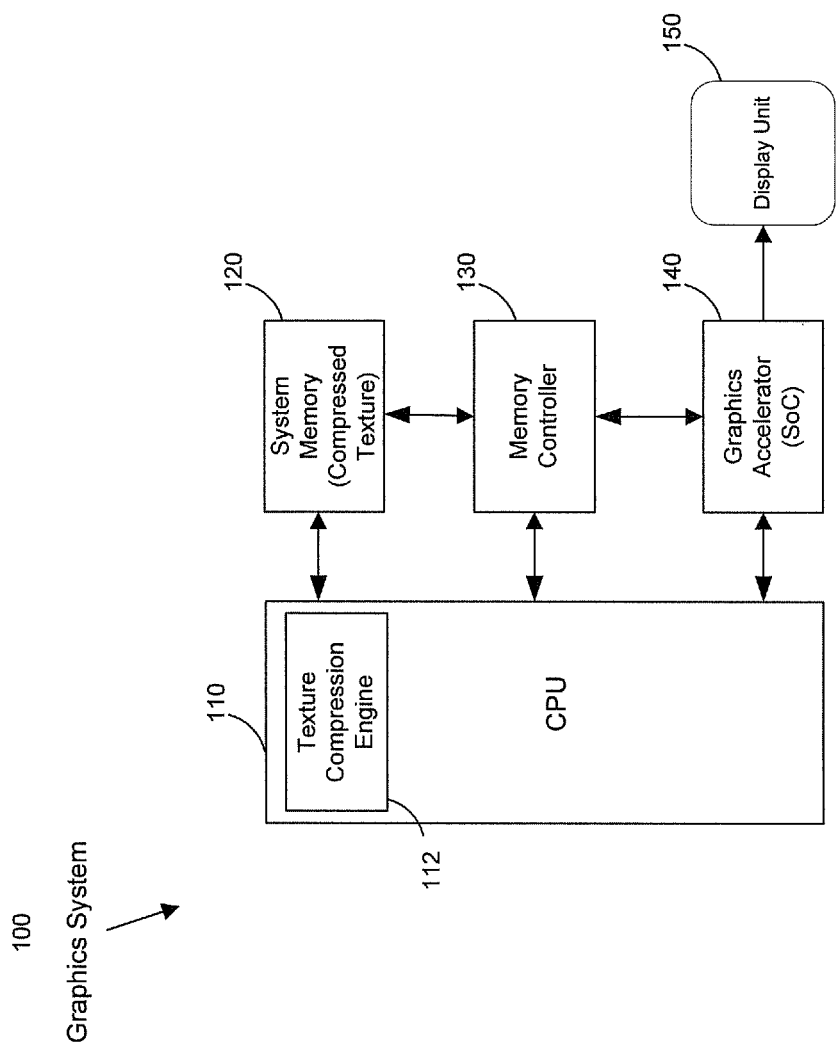
FIG. 1 is a diagram illustrating an exemplary graphics system that is operable to perform texture compression by transcoding texture and its mipmaps into AVC reference picture stream in a system with an AVC decoding engine and 3D engine, in accordance with an embodiment of the invention.

FIG. 1 is a diagram illustrating an exemplary graphics system that is operable to perform texture compression by transcoding texture and its mipmaps into AVC reference picture stream in a system with an AVC decoding engine and 3D engine, in accordance with an embodiment of the invention. Referring to FIG. 1, there is shown a graphics system 100. The graphics system 100 comprises a central processing unit (CPU) 110, a system memory 120, a memory controller 130, a graphics accelerator 140 and a display unit 150. The CPU 110 comprises a texture compression engine 112.

The CPU 110 may comprise suitable logic, circuitry, interfaces and/or code that may be operable to manipulate objects in a virtual space. The CPU 110 may be operable to execute various controls to manage operations of, for example, the graphics accelerator 140 and the texture compression engine 112.

The texture compression engine 112 may comprise suitable logic, circuitry, interfaces and/or code that may be operable to perform texture compression using hardware, and/or software. Textures may be used to enhance and/or change the appearance of surfaces in graphics. A "texel" is a texture element at a location in memory such as, for example, a frame buffer, texture buffer or other type of memory or array. The texture compression engine 112 may be operable to compress various types of texture information such as, for example, image data, picture data, transparency (alpha) information, smoothness data, roughness data, and/or other similarly structured data. For example, texture data may comprise a respective red (R), green (G), blue (B) and/or alpha value. Each texture may be utilized to construct one or more mipmaps.

A mipmap of a texture may comprise a portion of details of the texture. A plurality of mipmaps may be constructed from the texture or may be provided via an associated application program interface (API). Each mipmap of the texture may be a scaled down version of the highest resolution mipmap of the texture. The portion of the details of the texture may be indicated by a parameter called level-of-detail (LOD). Different values of the LOD may lead to different mipmaps of the texture. In this regard, the texture compression engine 112 may be operable to perform the texture compression on a texture and its mipmaps. The texture compression engine 112 may be operable to perform texture compression by transcoding the texture and its mipmaps into an AVC reference picture stream. For example, a mipmap with the $1^{st}$, LOD (the original texture) may be transcoded to the $1^{st}$, AVC reference picture in the AVC reference picture stream. A texture may be purely a depth texture, an alpha texture, a RGB texture, and an alpha RGB (ARGB) texture. Depending on the type of the texture such as a RGB texture or an ARGB texture, the compression engine 112 may be operable to form an AVC reference picture stream for the texture differently.

A depth texture and associated mipmaps may be transcoded into a sequence of reference only luminance or monochrome (Y component only) pictures with no auxiliary picture associated with each of the reference pictures.

An alpha only texture and associated mipmaps may be transcoded into a sequence of AVC reference only luminance and/or monochrome (Y component only) pictures with no auxiliary AVC picture associated with each of the reference pictures.

A RGB texture may comprise RGB components only. An ARGB texture may comprise RGB components as well as alpha components. For example, for a RGB texture, assume that N mipmaps may be constructed from the RGB texture, where N is an integer and N≥1. Each of the N mipmaps of the RGB texture may be transcoded into an AVC reference picture, separately. A mipmap with the $1^{st}$, LOD may be transcoded into the first AVC reference picture. A mipmap with the $2^{nd}$, LOD may be transcoded into the second AVC reference picture. The resulting N AVC reference pictures may form an AVC reference picture stream for the RGB texture. In instances when an alpha RGB (ARGB) texture may be considered, the texture compression engine 112 may be operable to split the ARGB texture into alpha components (an alpha texture) and RGB components (a RGB texture).

The texture compression engine 112 may be operable to transcode the alpha texture and its mipmaps into an AVC reference picture stream. Each resulting AVC reference picture may comprise monochrome or luma components. A depth texture and associated mipmaps may be transcoded into an AVC reference picture stream. Each resulting AVC reference picture may comprise luminance or monochromes (Y components only). The texture compression engine 112 may be operable to transcode the RGB texture and its mipmaps into an AVC reference picture stream. Each resulting AVC reference picture may comprise either RGB or YCbCr components. The AVC reference picture stream for the alpha texture may be added to the AVC reference picture stream for the RGB texture to form a single AVC reference picture stream for the ARGB texture. The texture compression engine 112 may be operable to perform transcoding between various compressed formats comprising JPEG, MPEG2, VC-1, and AVC, for example. The texture compression engine 112 may be operable to store compressed textures into, for example, the system memory 120. The texture compression engine 112 may be operable to store compressed texture off-line such that in a real-time rendering system, the compressed textures may be loaded to the graphics accelerator 140 to be decoded on-the-fly. The texture compression engine 112 may be implemented in software and/or hardware so as to support a constant compression rate as well as a variable compression rate. A compression rate used for texture compression may be determined based on available memory capacity, for example.

The system memory 120 may comprise suitable logic, circuitry, interfaces and/or code that may be operable to store information such as executable instructions and data that may be utilized by associated components such as the CPU 110 in the graphics system 100. The executable instructions may comprise algorithms that may be applied to texture compression. The data may comprise compressed texture data. The compressed texture data may be located in a dedicated region of the system memory 120. The system memory 120 may be operable to load compressed textures to the graphics accelerator 150 on an as needed basis. The system memory 120 may comprise RAM, ROM, low latency nonvolatile memory such as flash memory and/or other suitable electronic data storage.

The memory controller 130 may comprise suitable logic, circuitry, interfaces and/or code that may be operable to control and/or manage the usage of the system memory 120 as well as the graphics accelerator 140. The memory controller 130 may be operable to provide available memory capacity information to the texture compression engine 112 so as to determine a compression rate for texture compression.

The graphics accelerator 140 may comprise suitable logic, circuitry, interfaces and/or code that may be operable to acquire compressed texture data from the system memory 120 whenever it is needed. The graphics accelerator 140 may be operable to decompress the acquired compressed texture data for texture mapping. In this regard, the graphics accelerator 140 may be operable to perform texture decompression via AVC decoding. The decompressed textures may be applied by the graphics accelerator 140 to produce graphics information for display on the display unit 150. The graphics accelerator 140 may be implemented as system on chip (SoC).

The display unit 150 may comprise suitable logic, circuitry, interfaces and/or code that may be operable to visually present graphics information from the graphics accelerator 140 to users. The display unit 150 may be implemented in various ways such as a liquid crystal display (LCD) monitor, light emitting diode (LED), or a cathode ray tube (CRT) monitor, or other type of display.

In an exemplary operation, the CPU 110 may be operable to perform texture compression via the texture compression engine 112. The texture compressed engine 112 may be operable to compress a texture and its mipmap via transcoding into an AVC reference picture steam. In instances where the texture may be a RGB texture, the texture compressed engine 112 may be operable to transcode the RGB texture and its mipmaps into an AVC reference picture stream comprising either RGB or YCbCr components. In instances where the texture may be an ARGB texture, the ARGB texture may be split into alpha components (an alpha texture) and RGB components (a RGB texture) for AVC transcoding, respectively. The alpha texture and its mipmaps may be transcoded into an AVC reference picture stream comprising monochrome or luma components. The RGB texture and its mipmaps may be transcoded into an AVC reference picture stream comprising either RGB or YCbCr components. The AVC reference picture stream for the alpha texture may be added into the AVC reference picture stream for the RGB texture to produce a single AVC reference picture stream for the ARGB texture. Compressed textures may be stored in the system memory 120 to be loaded to the graphics accelerator 140 when need. The graphics accelerator 140 may be operable to decompress the loaded compressed textures via AVC decoding. The decompressed textures may be applied to a desired graphics scene to produce graphics information on the display unit 150.

Figure 2:
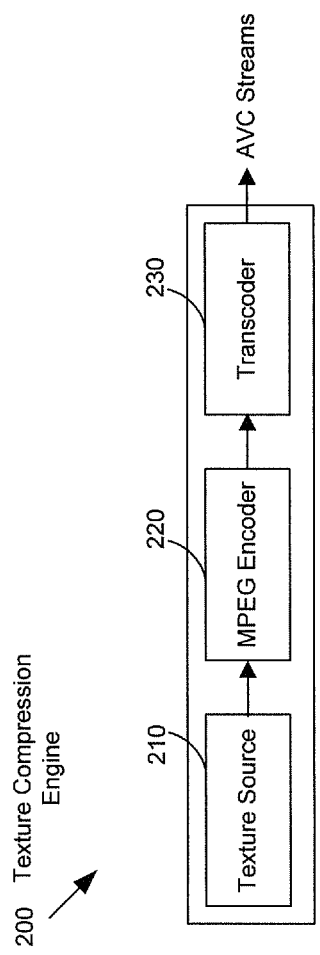
FIG. 2 is a block diagram of an exemplary texture compression engine that is operable to perform texture compression by transcoding texture and its mipmaps into AVC reference picture stream, in accordance with an embodiment of the invention.

FIG. 2 is a block diagram of an exemplary texture compression engine that is operable to perform texture compression by transcoding texture and its mipmaps into AVC reference picture stream, in accordance with an embodiment of the invention. Referring to FIG. 2, there is shown a texture compression engine 200 comprising a texture source 210, a MPEG encoder 220 and a transcoder 230.

The texture source 210 may comprise suitable logic, circuitry, interfaces and/or code that may be operable to provide uncompressed textures to the MPEG encoder 220. The texture source 210 may comprise, for example, a texture database and/or a texture library. In instances where a texture to be compressed may be a RGB texture, the texture source 210 may be operable to communicate the RGB texture to the MPEG encoder 220 for texture compression. In instances where a texture to be compressed may be an ARGB texture, the texture source 210 may be operable to split the ARGB texture into alpha components (an alpha texture) and THB components (a RGB texture). The alpha texture and the RGB texture may be communicated to the MPEG encoder 220 for texture compression.

The MPEG encoder 220 may comprise suitable logic, circuitry, interfaces and/or code that may be operable to encode (compress) the textures received from the texture source 210. The textures from the texture source 210 may comprise a RGB texture and/or an alpha texture. The RGB texture and the alpha texture may be encoded or compressed, separately. The resulting (MPEG) compressed textures may be communicated to the transcoder 230 for AVC transcoding.

The transcoder 230 may comprise suitable logic, circuitry, interfaces and/or code that may be operable to transcode a compressed texture and its mipmaps from the MPEG encoder 230 to an AVC reference picture stream. In instances where an ARGB texture may be considered, the resulting AVC reference picture stream for alpha components of the ARGB texture may be added into corresponding AVC reference picture stream for RGB components of the ARGB texture to produce a single AVC reference picture stream for the ARGB texture.

In an exemplary operation, a texture from the texture source 210 may be communicated to the MPEG encoder 220 for texture compression. In instances where the texture may be a RGB texture, the resulting compressed RGB texture may be communicated to the transcoder 230 for further texture compression. The transcoder 230 may be operable to transcode the compressed RGB texture into an AVC reference picture stream. Each of the AVC reference pictures comprises either RGB or YCbCr components. In instances where the texture provided by the texture source 210 may be an ARGB texture, the ARGB texture may be split into an alpha texture and a RGB texture before the MPEG encoding. The resulting alpha texture and the RGB texture may be MPEG encoded and transcoded into two different AVC reference picture streams. An AVC reference picture stream for the alpha texture may comprise monochrome or luma components. An AVC reference picture stream for the RGB texture may comprise either RGB or YCbCr components. The AVC reference picture stream for the alpha texture may be added to the AVC reference picture stream for the RGB texture to produce a single AVC reference picture stream for the ARGB texture. The transcoder 230 may be operable to provide AVC transcoded compressed textures to the graphics accelerator 140 to be used as graphics information when rendering graphics on the display unit 150.

Figure 3:
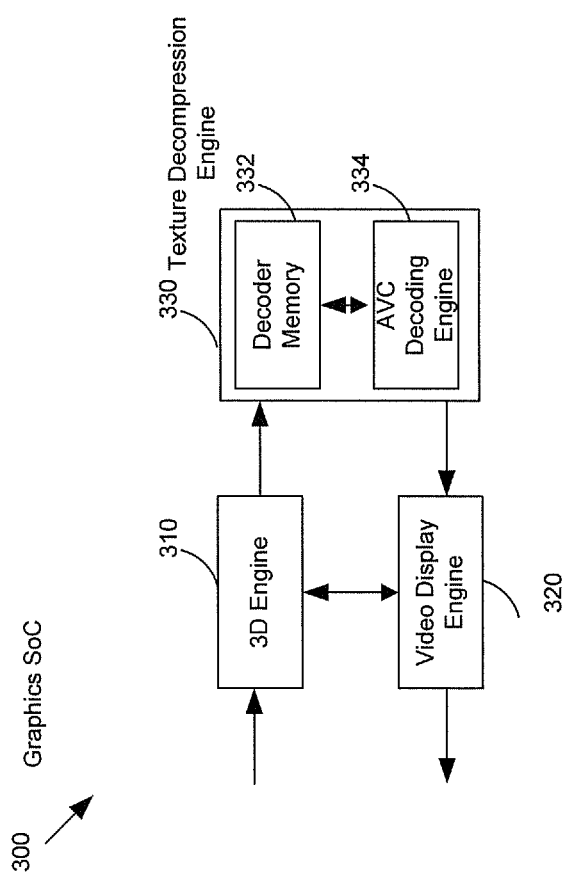
FIG. 3 is a block diagram of an exemplary graphics accelerator that is operable to perform graphics processing using AVC transcoded compressed textures, in accordance with an embodiment of the invention.

FIG. 3 is a block diagram of an exemplary graphics accelerator that is operable to perform graphics processing using AVC transcoded compressed textures, in accordance with an embodiment of the invention. Referring to FIG. 3, there is shown a graphics accelerator 300 comprising a 3D engine 310, a video display engine 320 and a texture decomposition engine 330. The texture decomposition engine 330 may comprise an AVC decoding engine 332 and a decoder memory 334, respectively.

The 3D engine 310 may comprise suitable logic, circuitry, interfaces and/or code that may be operable to process graphics data from the CPU via various graphics procedures such as, for example, a geometry processing and/or a rendering rasterization. The 3D engine 310 may be operable to produce a 3D graphics scene. The 3D engine 310 may be operable to communicate with, for example, the AVC decode engine 334 for decompressed textures (different format YCbCr and/or original uncompressed format) and send to the system memory 120 if needed. The 3D engine 310 may operable to communicate with the video display engine 320 to convert decompressed textures, which are produced by the AVC decoder 334 and are currently available in the system memory 120, to a corresponding original uncompressed texture format for texturing a corresponding 3D application.

The video display engine 320 may comprise suitable logic, circuitry, interfaces and/or code that may be operable to perform video processing on video data. The video display engine 320 may be operable to process video data in various video data formats such as, for example, YUV 4:2:2, or YUV 4:1:1, video data formats to accelerate software playback and video capture functions. The video display engine 320 may be operable to scale up the video data such as YUV 4:2:2, video data into a high resolution video data stream, for example, a true color RGB24, data. The video engine 320 may be operable to apply decompressed textures from the texture decompression engine 330 to the high resolution video data stream. In various embodiments of the invention, the video display engine 320 may be operable to control the display outputs like TVs and/or LCD displays, for example, color format conversion and YCbCr or RGB picture scaling.

The AVC decoding engine 332 may comprise suitable logic, circuitry, interfaces and/or code that may be operable to perform AVC decoding on compressed textures from the system memory 120. The AVC decoding engine 332 may be operable to provide decompressed textures to the video display engine 320 for graphics information on display.

The decoder memory 334 may comprise suitable logic, circuitry, interfaces and/or code that may enable storage of information such as executable instructions and data that may be utilized by the AVC decoding engine 332. The decoder memory 334 may comprise RAM, ROM, low latency non-volatile memory such as flash memory and/or other suitable electronic data storage.

In an exemplary operation, the 3D engine 310 may be operable to process graphics data from the CPU 110 and produce a 3D graphics scene. The 3D engine 310 may be operable to communicate information such as desired textures for the produced 3D graphics scene to the texture decompression engine 330. The 3D engine 310 may provide the processed graphics data to the video display engine 320 for video processing. The video display engine 320 may be operable to perform video processing on the processed graphics data from the 3D engine 310. The 3D engine 310 may be operable to provide the final 3D frame to the video display engine 320. The video display engine 320 may be operable to communicate the final 3D frame to the display unit 150 for display.

Figure 4:
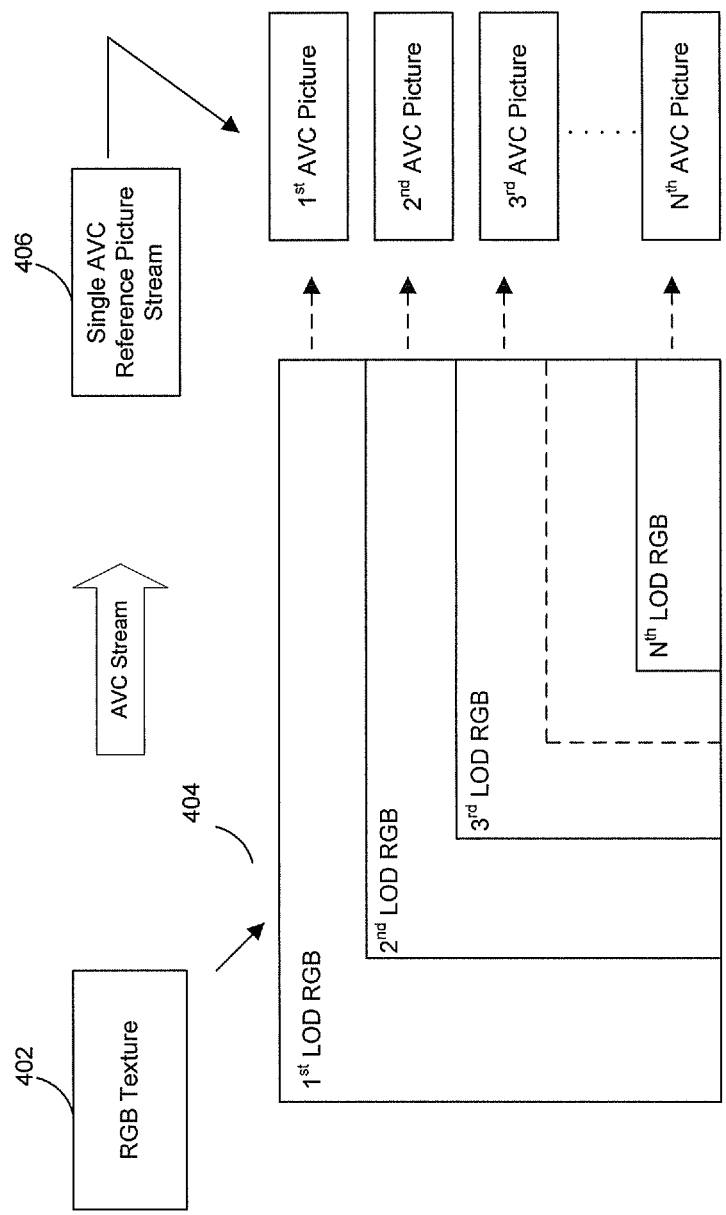
FIG. 4 is a block diagram illustrating exemplary transcoding of a RGB texture into an AVC reference picture stream, in accordance with an embodiment of the invention.

FIG. 4 is a block diagram illustrating exemplary transcoding of a RGB texture into an AVC reference picture stream, in accordance with an embodiment of the invention. Referring to FIG. 4, there is shown a RGB texture 402. N (N is an integer and N≥1) mipmaps 404 may be constructed from the texture 402. Parameter N and size of each of the N mipmaps 404 may be determined based on capabilities such as, for example, available memory in the decoder memory 332 and/or decoding speed of the AVC decoding engine 334, of the texture decompression engine 330. Each mipmap may be indicated by a specific LOD. The $1^{st}$, LOD mipmap may indicate the RGB texture 402. Each of the N mipmaps 404 may be transcoded into an AVC reference picture forming an AVC reference picture stream 406 for the RGB texture 402. For example, within N mipmaps 404, the mipmap with the $1^{st}$, LOD may be transcoded into the first AVC reference picture in the AVC reference picture stream 406. The mipmap with the $2^{nd}$, LOD may be transcoded into the second AVC reference picture in the AVC reference picture stream 406, and so on.

Figure 5:
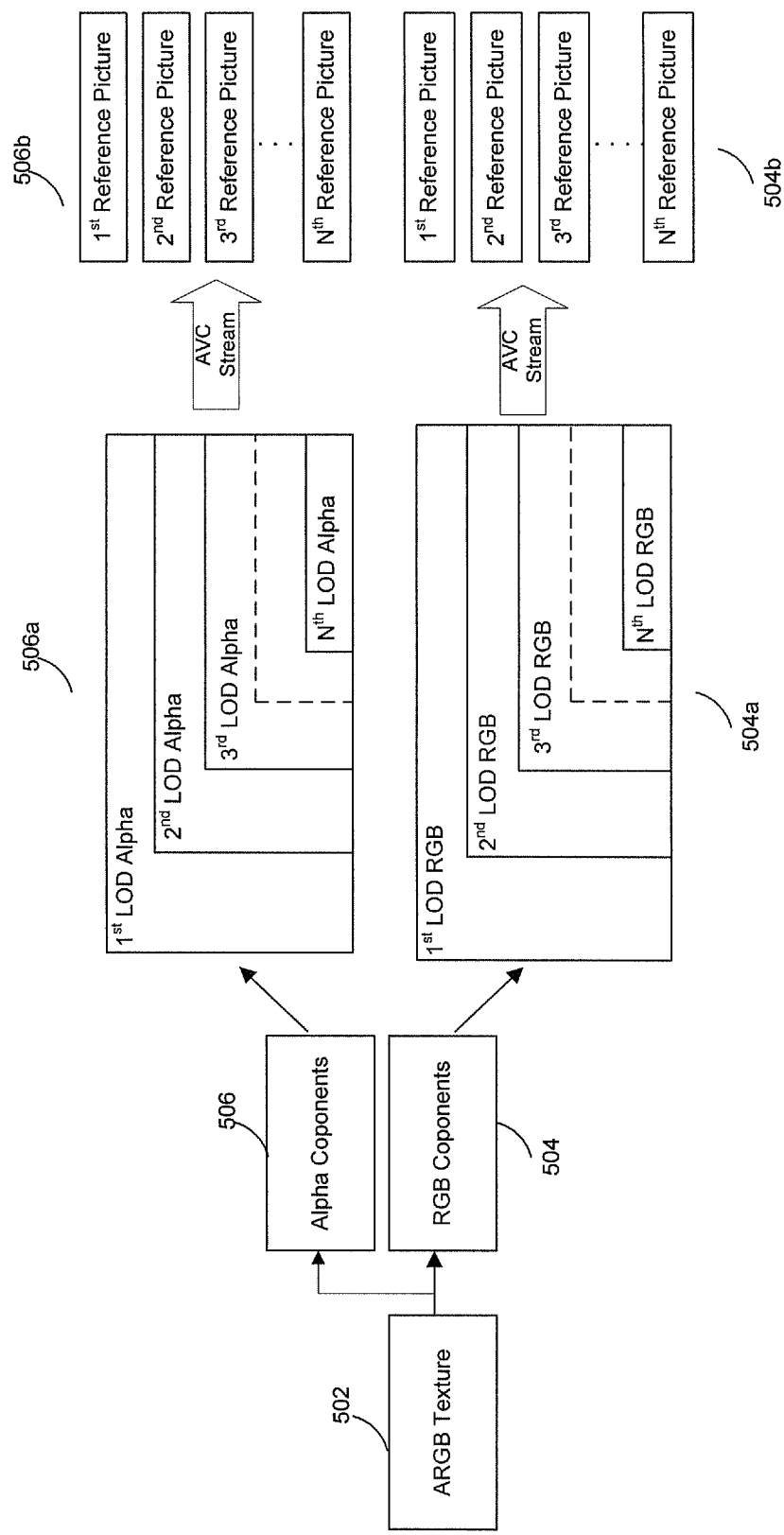
FIG. 5 is a block diagram illustrating exemplary transcoding of an ARGB texture into an AVC reference picture stream, in accordance with an embodiment of the invention.

FIG. 5 is a block diagram illustrating exemplary transcoding of an ARGB texture into an AVC reference picture stream, in accordance with an embodiment of the invention. Referring to FIG. 5, there is shown an ARGB texture 502 comprising RGB components 504 and alpha components 506. N (N is an integer and N≥1) mipmaps 504a, and 506a, may be constructed from the RGB components 504 and the alpha components 506, respectively. Parameter N and size of each of the N mipmaps 504a and 506a, may be determined based on capabilities such as, for example, available memory in the decoder memory 332 and/or decoding speed of the AVC decoding engine 334, of the texture decompression engine 330. Each mipmap may be indicated by a specific LOD. The $1^{st}$, LOD mipmap for the RGB components 504 may indicate the whole RGB components in the ARGB texture 502. The $1^{st}$, LOD mipmap for the alpha components 506 may indicate the whole alpha components in the ARGB texture 502. Each of the N mipmaps 504a, for the RGB components 504 may be transcoded into an AVC reference picture forming an AVC reference picture stream 504b, for the RGB components 504 of the ARGB texture 502. For example, within N mipmaps 504a, for the RGB components 504, the mipmap with the $1^{st}$, LOD may be transcoded into the first AVC reference picture in the AVC reference picture stream 504b.

The mipmap with the $2^{nd}$, LOD may be transcoded into the second AVC reference picture in the AVC reference picture stream 504b, and so on. Similarly, each of the N mipmaps 506a, for the alpha components 506 may be transcoded into an AVC reference picture forming an AVC reference picture stream 506b, for the alpha components 506 of the ARGB texture 502. For example, within N mipmaps 506a, for the alpha components 506, the mipmap with $1^{st}$, LOD may be transcoded into the first AVC reference picture in the AVC reference picture stream 506b. The mipmap with the $2^{nd}$, LOD may be transcoded into the second AVC reference picture in the AVC reference picture stream 506b, and so on. The AVC reference pictures in the AVC reference picture stream 506b, may be added to the corresponding AVC reference pictures in the AVC reference picture stream 504b, to produce a single AVC reference picture stream for the ARGB texture 502.

Figure 6:
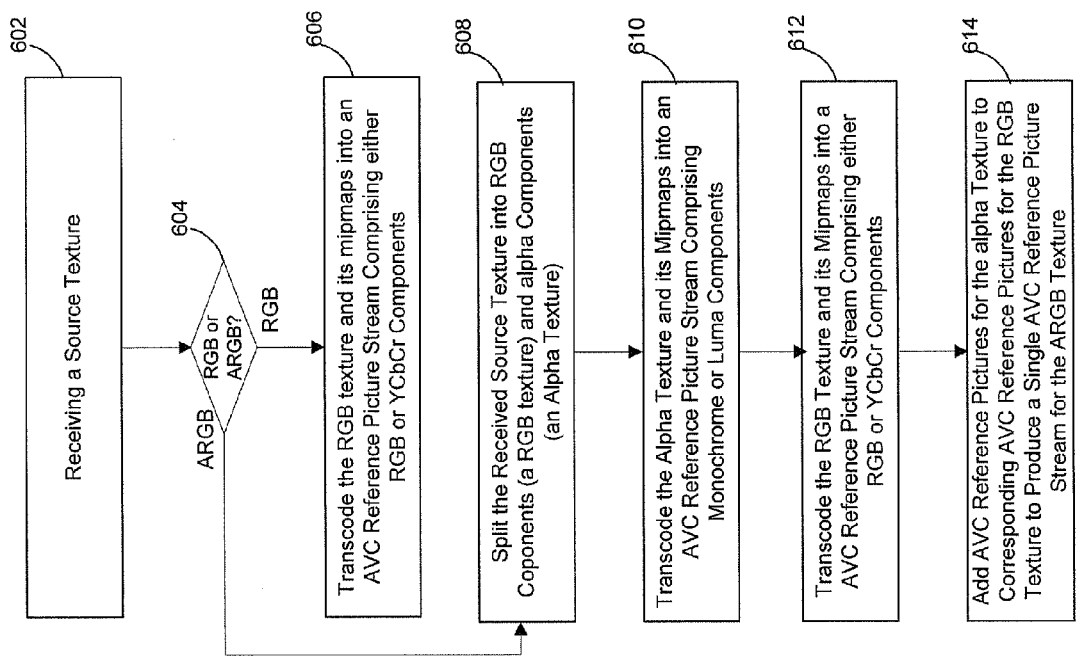
FIG. 6 is a flow chart illustrating exemplary steps for texture compression by transcoding texture and its mipmaps into an AVC reference picture stream, in accordance with an embodiment of the invention.

FIG. 6 is a flow chart illustrating exemplary steps for texture compression by transcoding texture and its mipmaps into an AVC reference picture stream, in accordance with an embodiment of the invention. The exemplary steps may start with the step 602. In step 602, the texture compression engine 112 may be operable to receive a source texture. In step 604, it may be determined whether the received source texture is a RGB texture or an ARGB texture. In instances when the received source texture is a RGB texture, then in step 606, the RGB texture and its mipmaps may be transcoded into an AVC reference picture stream. Each resulting AVC reference picture may comprise either RGB or YCbCr components.

In step 604, instances when the received source texture is an ARGB texture, then in step 608, the received source texture may be split into RGB components (a RGB texture) and alpha components (an alpha texture), separately. In step 610, the transcoder 230 may be operable to transcode the alpha texture and its mipmaps into an AVC reference picture stream. Each resulting AVC reference picture of the AVC reference picture stream for the alpha texture may comprise monochrome or luma components. In step 612, the transcoder 230 may be operable to transcode the RGB texture and its mipmaps into an AVC reference picture stream. Each resulting AVC reference picture of the AVC reference picture stream for the RGB texture may comprise either RGB or YCbCr components. In step 614, the texture compression engine 112 may be operable to add AVC reference pictures for the alpha texture to corresponding AVC reference pictures for the RGB texture to produce a single picture AVC for the ARGB texture.

Various exemplary aspects of the invention provide a method and system for texture compression in a system with an AVC decoding engine and a 3D engine. The texture compression engine 112 of an exemplary graphics processing device, as presented in the graphics system 100, may be operable to receive an uncompressed texture of a 3D graphic application from the texture source 210. The received uncompressed texture may be transcoded into an AVC reference picture stream via the transcoder 230. A plurality of mipmaps may be constructed from the received uncompressed texture. The texture compression engine 112 may be operable to determine a texture compression rate based on memory capacity information provided by the memory controller 130. The texture compression engine 112 may be operable to compress the received texture and the constructed plurality of mipmaps at the determined texture compression rate via the MPEG encoder 220. The compressed texture and the compressed plurality of mipmaps may be communicated with the transcoder 230 to be transcoded into the AVC reference picture stream. The transcoded texture and the transcoded plurality of mipmaps may be stored in the system memory 120. In instances where the received texture is a RGB texture, the transcoded texture and plurality of mipmaps may comprise either RGB or YCbCr components. In instances where the received texture is an ARGB texture, the transcoded texture and plurality of mipmaps may comprise monochrome or luma components. The graphics accelerator 140 may be operable to acquire or download the stored texture and the stored plurality of mipmaps from the system memory 120 for desired graphics information. The acquired texture and said acquired plurality of mipmaps may be decompressed by performing AVC decoding via the AVC decoding engine 334. The decompressed texture and the decompressed plurality of mipmaps may be utilized by the video display engine 320 to produce graphics information on the display unit 150.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for texture compression by transcoding texture and its mipmaps into AVC reference picture stream in a system with an AVC decoding engine and 3D engine.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for three-dimensional (3D) computer graphics, the method comprising:
performing by one or more processors, one or more circuits, or any combination thereof in a graphics device:
receiving a texture associated with a three-dimensional (3D) graphics application;
constructing a plurality of mipmaps using said texture;
compressing said texture and said plurality of mipmaps at a texture compression rate; and
transcoding said compressed texture and said compressed plurality of mipmaps into an advanced video coding (AVC) reference picture stream, said AVC reference picture stream comprising a reference picture for said compressed texture and a reference picture for at least one of said compressed plurality of mipmaps.

2. The method according to claim 1, comprising determining said texture compression rate for said texture and said plurality of mipmaps based on an available memory capacity.

3. The method according to claim 1, wherein said texture and said plurality of mipmaps comprise at least one of RGB or YCbCr components.

4. The method according to claim 1, wherein said texture and said plurality of mipmaps comprise at least one of monochrome or luma components.

5. The method according to claim 1, comprising decompressing said AVC reference stream via AVC decoding.

6. A system for communication, the system comprising:
one or more processors, one or more circuits, or any combination thereof for use in a device that processes video, wherein said one or more processors, one or more circuits, or any combination thereof is operable to:
receive a texture;
construct a plurality of mipmaps using said texture;
compress said texture and said plurality of mipmaps at a texture compression rate; and
transcode said compressed texture and said compressed plurality of mipmaps into an advanced video coding (AVC) reference picture stream, said AVC reference picture stream comprising a reference picture for said compressed texture and a reference picture for at least one of said compressed plurality of mipmaps.

7. The system according to claim 6, wherein said one or more processors, one or more circuits, or any combination thereof is operable to determine said texture compression rate for said texture and said plurality of mipmaps based on an available memory capacity.

8. The system according to claim 6, wherein said texture and said plurality of mipmaps comprise at least one of RGB or YCbCr components.

9. The system according to claim 6, wherein said texture and said plurality of mipmaps comprise at least one of monochrome or luma components.

10. The system according to claim 6, wherein said one or more processors, one or more circuits, or any combination thereof is operable to decompress said AVC reference stream via AVC decoding.

11. A method, comprising:
receiving a texture for a graphics application;
constructing a mipmap from said texture; and
transcoding, by a processing circuit, said texture and said mipmap into respective advanced video coding (AVC) reference pictures.

12. The method of claim 11, wherein:
said constructing comprises constructing a plurality of mipmaps from said texture; and
said transcoding comprises transcoding said texture and each of said plurality of mipmaps into said respective AVC reference pictures.

13. The method of claim 11, further comprising determining whether said texture is an alpha-RGB or RGB texture.

14. The method of claim 13, further comprising:
when said texture is an alpha-RGB texture, splitting said texture into an RBG component and an alpha component, wherein
said transcoding further comprises transcoding said alpha component into an AVC luma reference picture component, and transcoding said RGB component into an AVC RGB reference picture component.

* * * * *